(12) United States Patent
Ofek et al.

(10) Patent No.: US 7,886,978 B2
(45) Date of Patent: Feb. 15, 2011

(54) TECHNIQUES FOR DECODING IMAGES OF BARCODES

(75) Inventors: Eyal Ofek, Redmond, WA (US); Anne Loomis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 11/903,178

(22) Filed: Sep. 20, 2007

(65) Prior Publication Data

US 2009/0078772 A1 Mar. 26, 2009

(51) Int. Cl.
G06K 7/10 (2006.01)
G06K 9/36 (2006.01)

(52) U.S. Cl. ................. 235/462.1; 235/462.45

(58) Field of Classification Search .............. 235/462.1, 235/462.11

See application file for complete search history.

(56) References Cited

U.S. PATENT DOCUMENTS

| | | | |
|---|---|---|---|
| 4,896,029 A * | 1/1990 | Chandler et al. | 235/494 |
| 5,283,699 A | 2/1994 | Komai et al. | |
| 5,691,527 A * | 11/1997 | Hara et al. | 235/456 |
| 5,773,810 A * | 6/1998 | Hussey et al. | 235/462.25 |
| 5,834,749 A * | 11/1998 | Durbin | 235/454 |
| 6,037,874 A * | 3/2000 | Heironimus | 340/686.1 |
| 6,073,851 A | 6/2000 | Olmstead et al. | |
| 6,685,095 B2 | 2/2004 | Roustaei et al. | |
| 7,059,527 B2 | 6/2006 | Mergenthaler et al. | |
| 7,086,595 B2 | 8/2006 | Zhu et al. | |
| 2006/0091221 A1 | 5/2006 | He et al. | |
| 2006/0269136 A1 | 11/2006 | Squires et al. | |
| 2007/0013767 A1 | 1/2007 | Wang et al. | |
| 2007/0119938 A1 | 5/2007 | Madej | |

FOREIGN PATENT DOCUMENTS

| | | |
|---|---|---|
| KR | 10-2003-0028777 | 4/2003 |
| WO | 96-30217 | 10/1996 |
| WO | 00-38103 | 6/2000 |
| WO | 2005001541 A1 | 1/2005 |
| WO | 2006-049430 | 5/2006 |

OTHER PUBLICATIONS

Wittman, Todd, "Lost in the Supermarket: Decoding Blurry Barcodes", Sep. 2004, vol. 37, No. 7.
"PDF417 Barcode", http://www.intelcom.ru/2d/english/pdf417.php?group_id=a3.
"Restoration and Decoding of Barcode Images from Low Resolution Video Frames", http://www.sipl.technion.ac.il/new/Teaching/Projects/Barcode/index.html.
Ohbuchi, et al., "Barcode Readers using the Camera Device in Mobile Phones", 2004.
PCT Search Report Received for PCT Application No. PCT/US2008/071497, mailed on Feb. 17, 2009, 11 pages.

* cited by examiner

*Primary Examiner*—Thien M. Le
*Assistant Examiner*—Christopher Stanford
(74) *Attorney, Agent, or Firm*—Mayer & Williams PC

(57) ABSTRACT

Techniques for enhancing the reliable and efficient decoding of images of computer-readable symbols, which represent information encoded using a one- or two-dimensional visual symbology, are discussed. In accordance with one technique, prior to attempting to decode a particular image, a likelihood of successfully decoding the visual symbology from the image is determined based on a success metric. The success metric is calculated based on the blurriness of the image, or the tilt of the camera that captured the image, or both. Levels of blurriness or tilt, and the likelihood of decoding success, are ascertained with respect to predetermined reference values associated with generally decodable images. In accordance with another technique, image-sharpening algorithms are applied at select locations within the image. Such locations generally correspond to centers of modules within the visual symbology of the computer-readable symbol, which are assigned values based on grayscale values of proximate pixels in the image.

10 Claims, 5 Drawing Sheets

TECHNIQUES FOR DECODING IMAGES OF BARCODES

BACKGROUND

Barcodes, which also include matrix codes such as QR codes, are computer-readable symbols that represent information encoded using a visual symbology, which is displayed on a surface. A visual symbology is a visual object of any size or shape that is composed of modules having binary reflective values (for example, black or white).

Barcodes have historically mostly been used for identifying and tracking items such as commercial goods, and in fields such as healthcare, computer programming, and mail/package delivery. Devices configured to read barcodes are usually special-purpose devices used by businesses or other organizations to retrieve and manage the information encoded by barcodes. Recently, there has been an increase in the use of barcodes on business cards, signage, and the like, to transfer encoded personal and business information (such as contact information and URLs) to individuals that use camera-equipped electronic devices such as mobile phones, personal digital assistants, media players, and the like to obtain images of the barcodes. Decoding the barcode images obtained by individuals using camera-equipped devices, however, can be problematic.

Existing decoding techniques are often only able to decode images captured via a macrolens, which is a lens optimized to focus sharply on a small area relative to the size of the image capture medium. Barcode images captured with other types of lenses—widely present in mobile phones and other electronic devices—are often too blurry to be reliably decoded. Moreover, existing decoding techniques may be inefficient, generally consuming relatively large amounts of resources such as power and processing resources, which are available in limited supply on many portable devices.

Variations in camera orientation with respect to the surface upon which a particular barcode is displayed (for example, variable tilts or distances) can also negatively affect the reliability or efficiency of existing decoding techniques, and users do not always know, or understand how to achieve, the most desirable camera orientations.

SUMMARY

Techniques for enhancing the reliable and efficient decoding of images of computer-readable symbols captured by cameras or camera-equipped devices are discussed herein. The images are composed of pixels having grayscale values. For exemplary purposes, a square QR code having square modules arranged in accordance with a predefined 2-dimensional coordinate system is discussed, although it will be appreciated that computer-readable symbols and modules thereof may be of any desired dimensions, sizes or geometries.

In accordance with one technique, a success metric is calculated based on either the blurriness of an image of a particular computer-readable symbol, or the tilt of the image capture device that obtained the image relative to the surface upon which the computer-readable symbol was arranged, or both. Then, prior to attempting to decode the image, a likelihood of successfully decoding the visual symbology from the image is determined based on the success metric, and decoding is only attempted when there is determined to be a sufficient likelihood of success. When there is determined not to be a sufficient likelihood of success, a new image of the computer-readable symbol is obtained and the success metric is calculated for the new image. Optionally, user feedback is provided to improve the chances that the new image can be successfully decoded. Examples of user feedback include but are not limited to instructions or information regarding a desirable orientation (such as a desirable distance or tilt) of the image capture device relative to the surface.

In accordance with another technique, after the coordinate system of the computer-readable symbol is obtained from the image, image-sharpening algorithms are applied at select locations within the image. The locations generally correspond to estimated locations of the centers of modules that comprise the visual symbology. Values are assigned to the select locations based on a relationship between grayscale values of pixels in the image proximate to the locations (for example, an average value of such proximate pixels). A first array of values is formed using the values assigned to the select locations. An image sharpening algorithm is applied to the first array of values to form a second array of values. Then, the visual symbology may be decoded using the second array of values.

Using one or both of the above techniques reduces computational complexity associated with decoding images, and conserves decoding-related resources such as processing resources, power resources, and/or communication resources.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

The reliable and efficient decoding of images of computer-readable symbols such as barcodes and matrix codes is desirable to ensure user satisfaction with, and the efficient use of limited resources of, camera-equipped electronic devices such as mobile phones, personal digital assistants, media players, and the like. Failures and inefficiencies can often arise when attempting to decode certain images, either because the images are too blurry, or the tilt of the image capture device relative to the surface upon which the computer-readable symbol is arranged was too great, or both. Techniques discussed herein enhance the accurate and efficient decoding of images of computer-readable symbols that are blurry and/or the result of an imperfect camera orientation.

Figure 1:
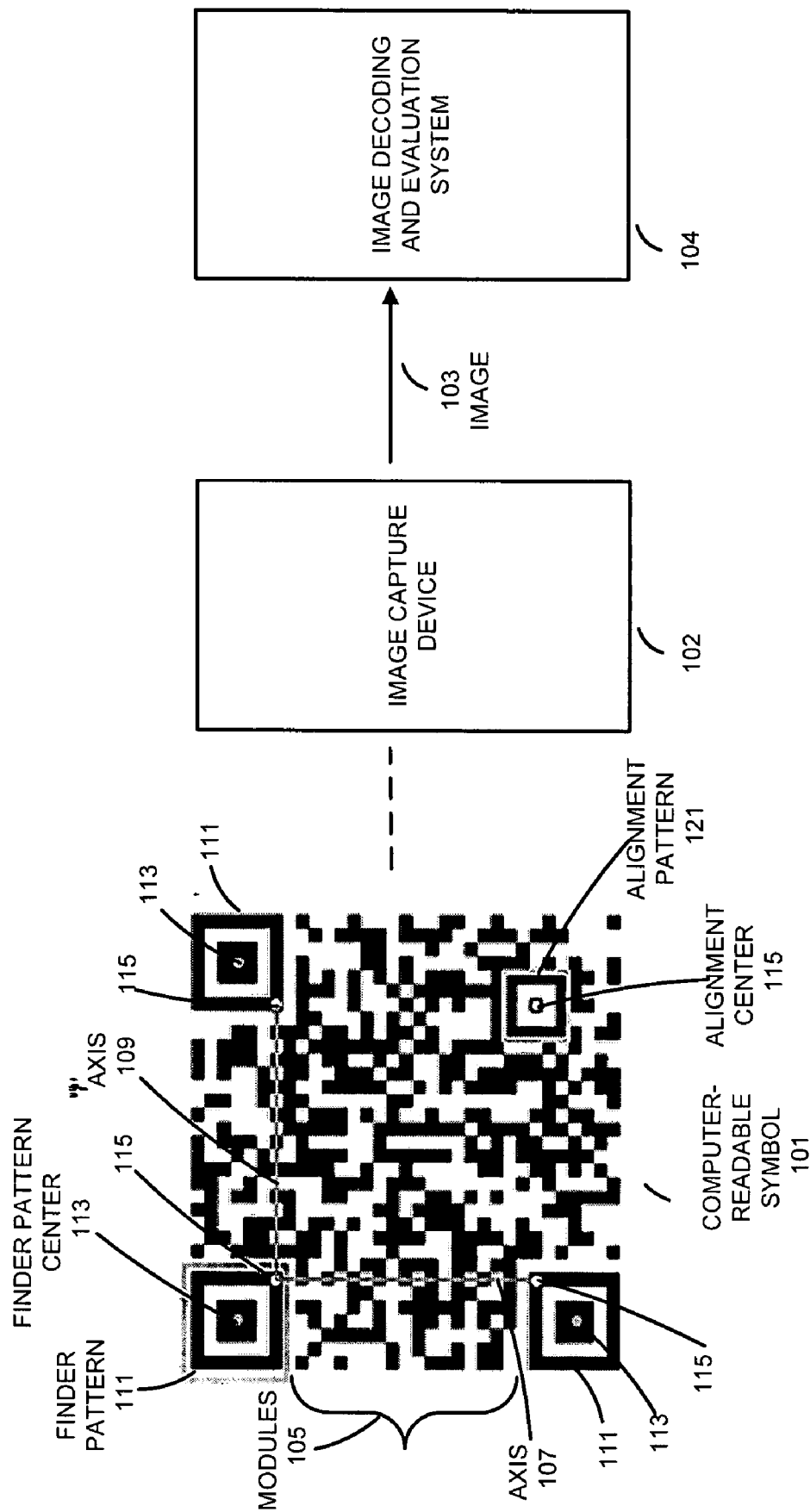
FIG. 1 is a block diagram illustrating an exemplary computer-readable symbol, an image of which is captured by an image capture device and processed by an image evaluation and decoding system.

Turning now to the drawings, where like numerals designate like components, FIG. 1 is a block diagram illustrating a computer-readable symbol 101, an image 103 of which is captured by a digital image capture device 102 and processed to retrieve the information encoded thereby using an image decoding and evaluation system ("IDES") 104. Aspects of IDES 104 may be co-located with image capture device 102, or remotely located on a separate device, such as a personal computer or a networked server, and accessed by any now known or later developed wireless or wired, public or private, communication equipment, protocol, or technique.

For exemplary purposes, computer-readable symbol 101 is discussed in the context of a square QR code. The actual dimensions of QR code are one inch by one inch, although the QR code has been enlarged for illustration purposes. QR code 101 has a number of square modules 105, which each have binary reflectance values corresponding to either black or white, arranged on a surface in accordance with a 2-dimensional coordinate system defined by a vertical axis 107 and a horizontal axis 109 (axes 107 and 109 may also be referred to as "timing lines" and are discussed further below). It will be appreciated that computer-readable symbol 101 and modules 105 thereof may be of any pre-defined sizes or geometries, and may have both one- and two-dimensional configurations. It will also be appreciated that computer-readable symbol 101 may be used to encode any type of information now known or later developed, including but not limited to encoded personal and business information (such as contact information and URLs), product codes, healthcare information, computer programming information, and mail/package delivery information.

Generally, certain groups of modules 105 are arranged within QR code 101 in pre-defined manners to facilitate decoding and information retrieval. As shown, QR code 101 includes a number of finder patterns 111 (three are shown, although additional finder patterns are possible), and an alignment pattern 121 (one is shown, although additional alignment patterns are possible). Finder patterns 111 are located in the top left, top right, and lower left corners of QR code 101. Each finder pattern 111 is a 7-by-7 module square, for which any horizontal or vertical line through the center (referred to as a finder pattern center 113) thereof crosses modules having reflectance value patterns of dark-light-dark-light-dark in a sequence of 11311. That is, such horizontal and vertical lines through each finder pattern center 113 will cross modules in the following sequence: 1 black module; 1 white module; 3 black modules; 1 white module; and 1 black module. Four alignment centers 115 are illustrated-three fall within finder patterns 111, at predetermined locations in the corners- thereof, and a fourth within the center of alignment pattern 121. The three alignment centers 115 located within finder patterns 111 provide the endpoints for timing lines 107 and 109. Timing lines 107 and 109 are lines between two predetermined alignment centers 115, which are used to identify the coordinate system of QR code 101.

Recovering estimated locations of finder patterns 111, alignment patterns 121, and timing lines 107 and 109 from a particular image 103 facilitates decoding of the visual symbology within image 103 to retrieve the information represented thereby. One technique for locating finder patterns 111 within image 103 involves locating groups of modules having certain dimensions, such as 7×7 module groups, and looking for reflectance value patterns therein (for example, dark-light-dark-light-dark) having certain sequences (for example, 11311). Then, image processing techniques are used on substantially the whole image to decode the visual symbology within the image.

Figure 2:
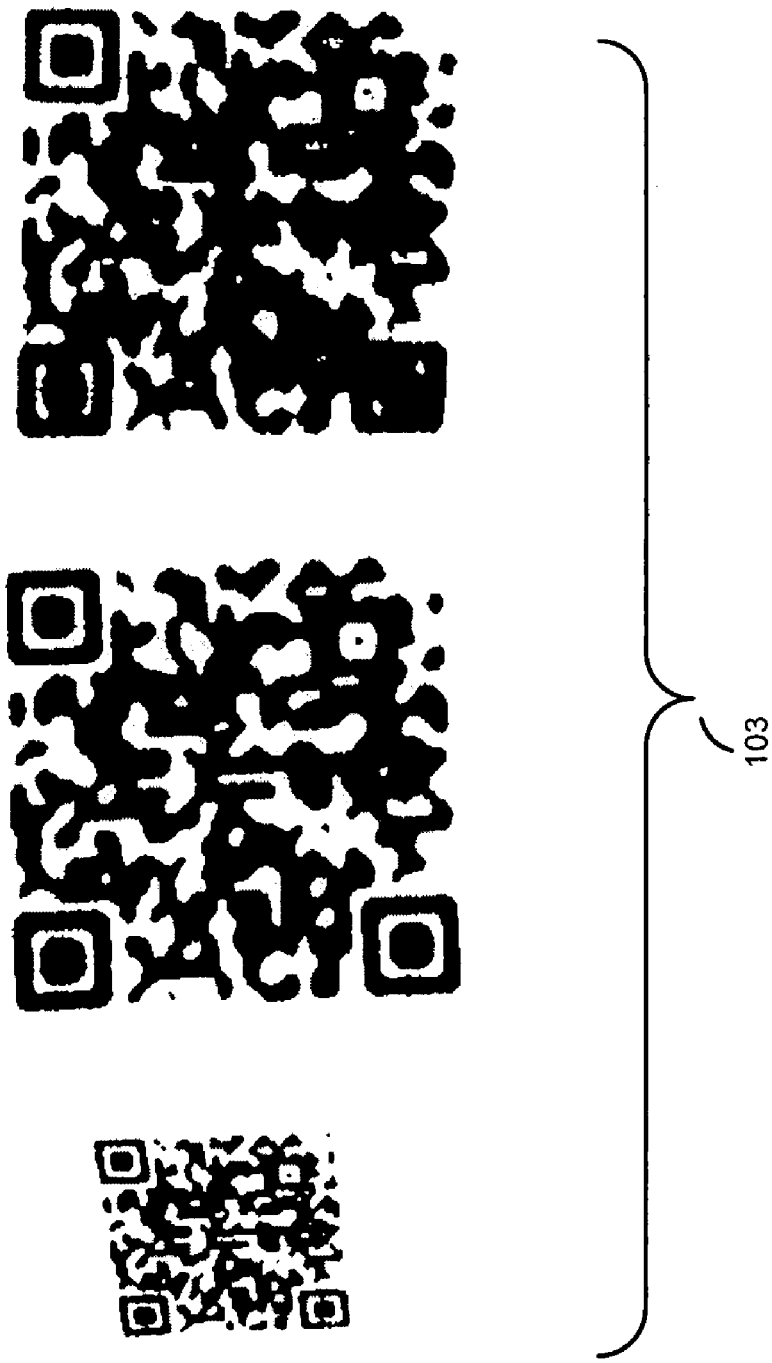
FIG. 2 illustrates three exemplary images, obtained by the same image capture device, of the computer-readable symbol shown in FIG. 1.

Using such computationally expensive algorithms with images obtained by users of portable camera-equipped devices, however, is often unsuccessful or impractical. FIG. 2 illustrates three actual images, composed of individual pixels having grayscale values (not visible), of a 1"×1" QR code taken from different positions by a user with the same portable image capture device. It can be seen that user-captured images may be too blurry (which may occur when a lens of the image capture device is not optimized to focus sharply on the computer-readable symbol and/or the distance between the lens and the computer-readable symbol is not optimal), or too tilted (which may occur when the angle of the image capture device relative to the surface upon which the computer-readable symbol was displayed was too great), or both. When an image is excessively blurry or tilted, it is difficult to ascertain the correct light and dark values based on grayscale values of pixels in the image—for example, a single white module that is surrounded by eight black neighbors may have a misleadingly dark grayscale value because of excessive blurring or tilting.

Figure 3:
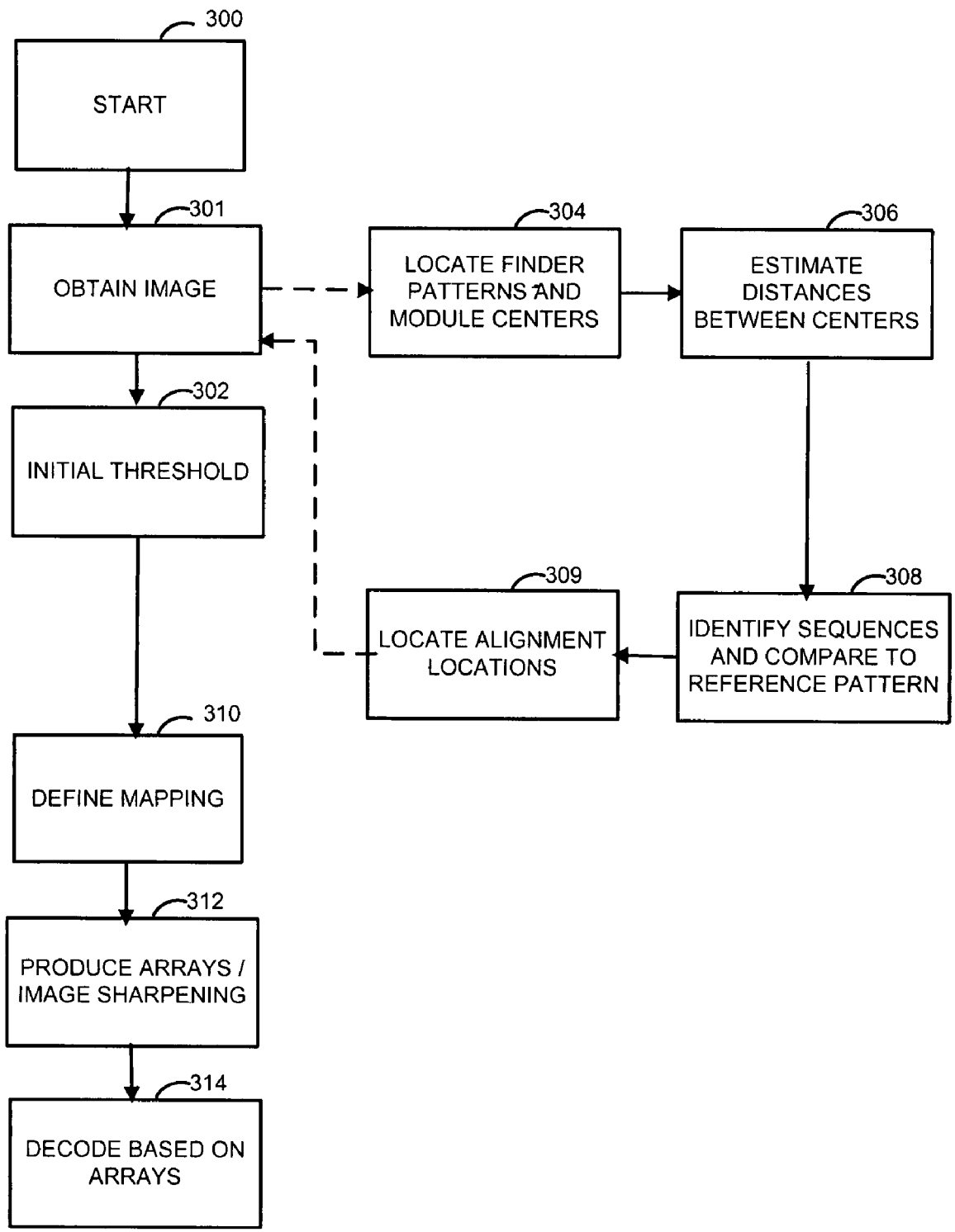
FIG. 3 is a flowchart of a method for decoding an image of a computer-readable symbol using aspects of the image evaluation and decoding system shown in FIG. 1.
Figure 5:
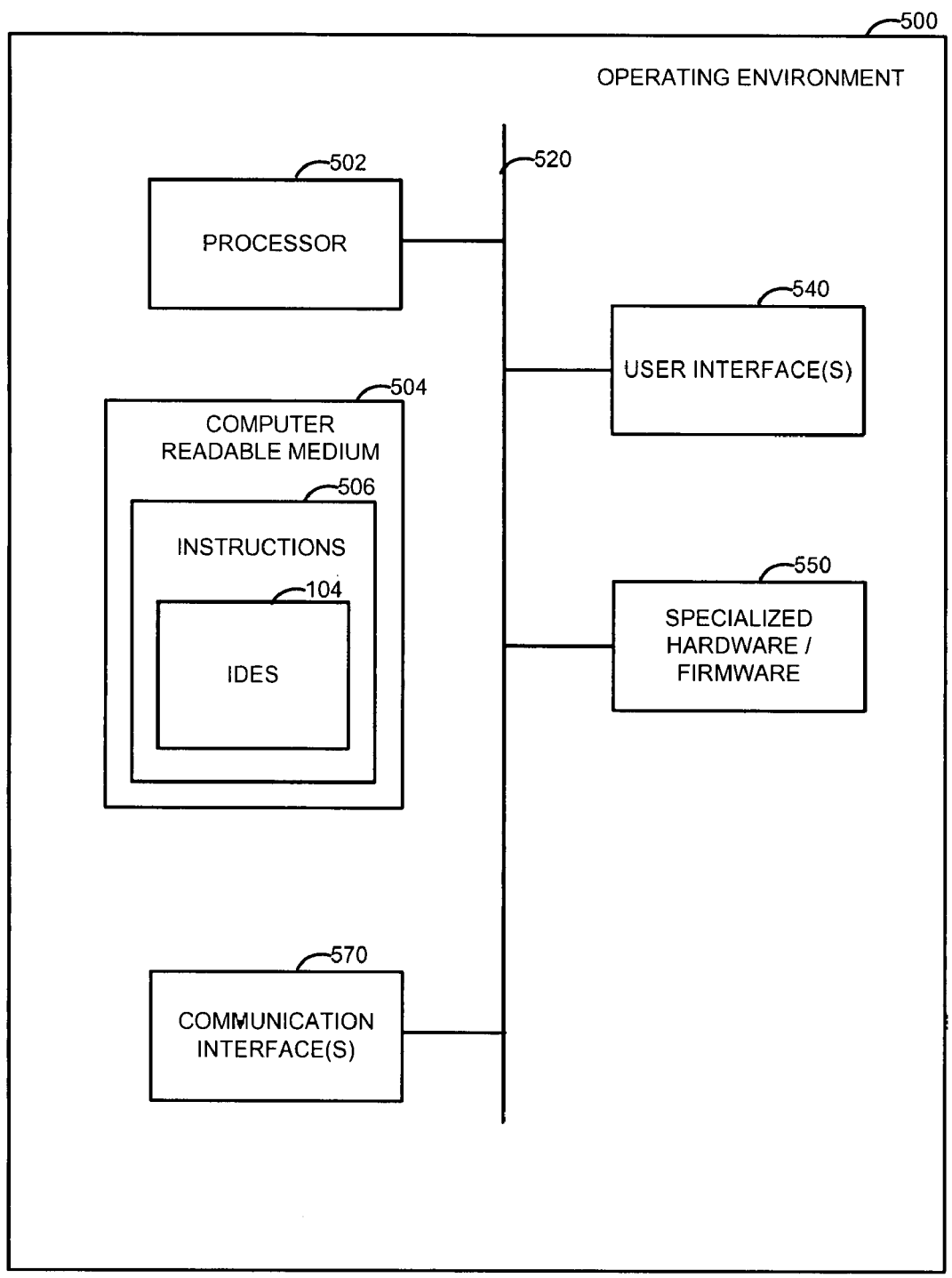
FIG. 5 is a simplified block diagram of an exemplary configuration of an operating environment in which all or part of the image evaluation and decoding system shown in FIG. 1, or the methods shown in FIGS. 3 and 4, may be implemented or used.

With continuing reference to FIGS. 1 and 2, FIG. 3 is a flowchart of one method for decoding an image, such as image(s) 103 depicted in FIG. 2, of a computer-readable symbol, such as QR code 101, using aspects of IDES 104. The method(s) illustrated in FIG. 3 may be implemented using computer-executable instructions executed by one or more general, multi-purpose, or single-purpose processors (exemplary computer-executable instructions 506 and processor 502 are discussed further below, in connection with FIG. 5). Unless specifically stated, the methods described herein are not constrained to a particular order or sequence. In addition, some of the described methods or elements thereof can occur or be performed concurrently. It will be understood that all of the steps shown need not occur in performance of the functions described herein.

The method begins at block 300, and continues at block 301, where an image, such as image 103, of a computer-readable symbol, such as QR code 101, is obtained.

At block 302, an initial threshold is ascertained. The step of ascertaining the initial threshold is described in more detail at blocks 304, 306, 308, and 309. At block 304, a number of sections of image 103 that are estimated to correspond to finder patterns 111 are located. Next, for each section of image 103 corresponding to a finder pattern, the distances between locations estimated to correspond to centers of modules 105 having different reflectance values are estimated, as indicated at block 306. At block 308, sequences of estimated distances (from block 306) are identified and compared to a predetermined reference pattern/sequence of distances. The sequences of estimated distances are usually less variant due to blurring or tilting than are the sequences of reflectance values themselves, so that identifying sequences is generally possible even in somewhat blurry or tilted images. In one scenario, the predetermined reference pattern/sequence of distances in QR code 101 is 1221—that is, the distance between the center of the first black module and the next white one is 1, and so on. An alignment location within each section of image 103 corresponding to a finder pattern is deemed to have been found, as indicated at block 309, when a horizontal line, a vertical line, or both, would pass through an identified sequence of estimated distances corresponding to the predetermined reference pattern.

The step of defining a mapping is illustrated at block 310. Generally, a mapping between modules 105 of QR code 101 and groups of pixels within image 103 can be defined based on timing lines between alignment locations identified at block 309. Based on the mapping, it is possible to estimate locations within image 103 that correspond to centers of modules 105 within QR code 101, and to identify pixels within a predetermined distance of such locations, referred to as "proximate pixels."

The steps of producing arrays and image sharpening are illustrated at block 312. In the context of QR code 101 and image 103, a value is assigned to each location within image 103 that corresponds to a center of a module within QR code 101, in accordance with the mapping defined at block 310. Generally, the value is based on a relationship between grayscale values of proximate pixels associated with each location. In one possible implementation, the value represents an average grayscale value of all or a subset of the proximate pixels. An array of assigned values is formed, which for discussion purposes is referred to as array A[i][j]. Image sharpening techniques are applied to array A[i][j] to produce a new array of values, which is used to decode the visual symbology within image 103 and retrieve the information represented thereby, as indicated at block 314. An exemplary image sharpening technique is an unsharp mask, although it will be appreciated that any known or later developed image sharpening technique may be used. To apply an unsharp mask and produce the new array of values, the $2^{nd}$ derivative of the values in the A[i][j] array is calculated by applying a filter to the 3×3 neighborhood of each value in the A[i][j] array. An exemplary 3×3 filter is shown below:

$$\begin{bmatrix} 0 & -1 & 0 \\ -1 & 4 & -1 \\ 0 & -1 & 0 \end{bmatrix}$$

Because array A[i][j] will usually have much smaller dimensions than the array of pixels of image 103 (for example, array A[i][j] may have dimensions such as 10×10 or 30×30, versus potentially millions of pixels within image 103), the computational complexity for applying image sharpening techniques to array A[i][j] can be much less than for applying such techniques to image 103 directly.

With continuing reference to FIGS. 1-3, FIG. 4 is a flowchart of another method for decoding an image, such as image(s) 103 depicted in FIG. 2, of a computer-readable symbol, such as QR code 101, using aspects of IDES 104. The method(s) illustrated in FIG. 4 may be implemented using computer-executable instructions executed by one or more general, multi-purpose, or single-purpose processors (exemplary computer-executable instructions 506 and processor 502 are discussed further below, in connection with FIG. 5). Unless specifically stated, the methods described herein are not constrained to a particular order or sequence. In addition, some of the described methods or elements thereof can occur or be performed concurrently. It will be understood that all of the steps shown need not occur in performance of the functions described herein.

The method begins at block 400, and continues at block 402, where an image, such as image 103, of a computer-readable symbol, such as QR code 101, is obtained.

At block 404, a success metric associated with the image is evaluated, and based on the success metric, it is determined at diamond 406 whether there is or is not a likelihood that the image can be successfully decoded. As indicated at block 410, an attempt to decode image 103 is made when, based on evaluation of the success metric, there is deemed to be a sufficient likelihood of decoding success. When evaluation of the success metric indicates that there is not a sufficient likelihood of decoding success, user feedback may be provided, as indicated at block 408. Examples of user feedback include but are not limited to instructions or information regarding a desirable orientation (such as a desirable distance or tilt) of the image capture device relative to the surface. User feedback can improve the chances that the new image (obtained at block 402) can be successfully decoded.

The success metric is an expression or function which, when evaluated, resolves to a value, such as a numeric value or another type of value representing a decision or result. In one possible implementation, the value resulting from evaluation of the success metric may be compared to a threshold value (or one or more other predetermined values) to determine the likelihood of decoding success. Generally, the success metric is an expression or function dependent on variables based on either the blurriness of image 103, or the tilt of image capture device 102 relative to the surface upon which computer-readable symbol 101 is displayed, or both.

One exemplary manner of determining the blurriness of an image is to calculate the magnitude of the image gradient at the midpoint between estimated locations within image 103 that correspond to centers of modules 105 of different binary reflectance values, as determined by differences in grayscale values of one or more pixels at or around the estimated locations. The estimated locations may correspond to modules 105 within finder patterns 111, for example. In a relatively sharp image, there is a large image gradient, and thus a large difference in pixel grayscale values as measured at the midpoint, as the image brightness goes from white to black and vice-versa. In a relatively blurry image, the image gradient is smaller and spread over a greater area, and thus the pixel grayscale value differences as measured at the midpoint are generally smaller. A level of blurriness may be assigned based on the magnitude of the image gradient (it is possible for predetermined ranges of image gradient magnitudes to correspond to certain positive or negative assigned levels of blurriness), and input to the success metric.

One exemplary manner of determining the tilt of an image capture device relative to the surface upon which a computer-readable symbol is displayed involves locating at least three points in an image (in one scenario five points are located), and determining the orientation of the image capture device relative to the surface based on the at least three points. In one exemplary implementation, the locations of the three centers of finder patterns 111 and two alignment centers 115 are estimated (see FIG. 3, blocks 304, 306, 308, and/or 309), the orientation is determined based on the estimated locations, and an image tilt value that reflects the orientation is assigned (it is possible for predetermined ranges of orientations to correspond to certain positive or negative assigned image tilt values) and input to the success metric.

Because determining the orientation of the image capture device relative to the surface on which the computer-readable symbol is displayed can be a computationally expensive task, alternative techniques for determining the orientation may be used. In accordance with one alternative technique, an aspect ratio of the visual symbology within image 103 is estimated, and the estimated aspect ratio (which can correspond to an image tilt value input to the success metric) is compared to an acceptable aspect ratio (for example, a square). An estimated aspect ratio/image tilt value that is deemed to be too different from an acceptable aspect ratio causes the success metric to resolve to a value that leads to the image not being deemed to have a likelihood of being successfully decoded.

Acceptable aspect ratios may be defined in any desirable manner. One manner of defining acceptable aspect ratios includes: taking a variety of test images using a particular image capture device; attempting to decode the test images; recording certain reference information from the test images (such as scale values and ratio values (discussed further below), along with decoding success or failure data); graphically representing the reference information from the test images; and defining certain regions of the graphical representations (for example, coordinate ranges) within which information from images usually falls when decoding is successful and/or unsuccessful.

Exemplary reference information (and information obtained from images to which the success metric is being applied) includes but is not limited to scale values and ratio values. To obtain scale and ratio values, estimated locations of three points within image 103 (for example, the locations of the three centers of finder patterns 111) are ascertained, and two distances are calculated—a first distance between one of the three points defined as the first point and one of the other two points, and a second distance between the first point and other of the two points. The scale value is defined by the maximum of the first distance and the second distance, and the ratio value is defined by a ratio between the first distance and the second distance. Scale-vs-ratio points obtained from test images can be used to define a two-dimensional graph having one or more areas that generally resulted in decoding success, and/or one or more areas that generally resulted in decoding failure.

In the context of image 103, the estimated aspect ratio of image 103 can be considered to be the scale and ratio values from image 103. An image tilt value of image 103, then, can be defined by the region in which image 103's scale-vs-ratio point falls on the two-dimensional graph of scale-vs-ratio points obtained from the test images. The image tilt value may fall in an area generally associated with decoding success, or an area generally associated with decoding failure. Evaluation of the success metric may indicate a likelihood that the image can be successfully decoded when the image tilt value that falls in an area associated with decoding success, and indicate likelihood that the image cannot be successfully decoded when the image tilt value falls in an area associated with decoding failure.

Figure 4:
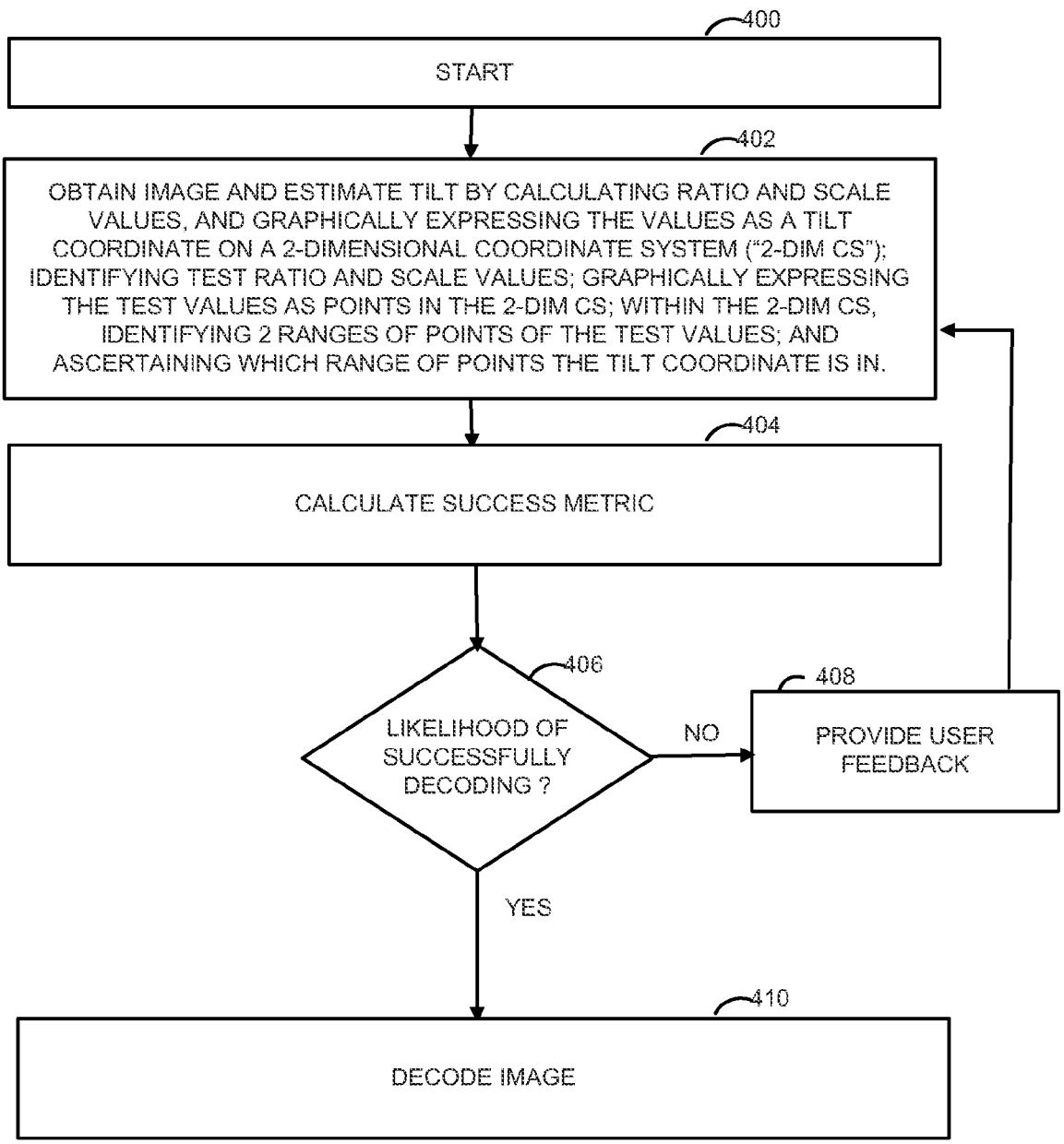
FIG. 4 is a flowchart of another method for decoding an image of a computer-readable symbol using aspects of the image evaluation and decoding system shown in FIG. 1.

With continued reference to FIGS. 1-4, FIG. 5 is a block diagram of an exemplary configuration of an operating environment 500 (such as a client-side device or client-based application or a network server or service) in which all or part of IDES 104 and/or the method(s) shown and discussed in connection with FIGS. 3 and 4 may be implemented or used. Operating environment 500 is generally indicative of a wide variety of general-purpose or special-purpose computing environments, and is not intended to suggest any limitation as to the scope of use or functionality of the system(s) and methods described herein. For example, operating environment 500 may be a type of portable or non-portable device such as a phone, a personal media rendering device, a personal computer, a digital camera, a server, a digital video recorder, or a personal digital assistant.

As shown, operating environment includes processor 502, computer-readable media/medium 504, and computer-executable instructions 506. One or more internal buses 520, which are widely available elements, may be used to carry data, addresses, control-signals and other information within, to, or from operating environment 500 or elements thereof.

Processor 502, which may be a real or a virtual processor, controls functions of operating environment 500 by executing computer-executable instructions 506. Processor 502 may execute instructions 506 at the assembly, compiled, or machine-level to perform a particular process.

Computer-readable media 504 represent any number and combination of local or remote devices, in any form, now known or later developed, capable of recording, storing, or transmitting computer-readable data, such as computer-executable instructions 506 or images 103. In particular, computer-readable media 504 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 504 may also include transmission media and data associated therewith. Examples of transmission media/data include, but are not limited to, data embodied in any form of wireline or wireless transmission, such as packetized or non-packetized data carried by a modulated carrier signal.

Computer-executable instructions 506 represent any signal processing methods or stored instructions. Generally, computer-executable instructions 506 are implemented as software components according to well-known practices for component-based software development, and encoded in computer-readable media (such as computer-readable media 504). Computer programs may be combined or distributed in various ways. Computer-executable instructions 506, however, are not limited to implementation by any specific embodiments of computer programs, and in other instances may be implemented by, or executed in, hardware, software, firmware, or any combination thereof. As shown, certain computer-executable instructions 506 implement aspects of IDES 104.

Operating environment further includes input interface(s) such as user interface(s) 540 or other input interfaces, which are physical or logical elements that facilitate receipt of input to operating environment 500. Input may be received using any type of now known or later-developed physical or logical elements, such as remote controls, displays, mice, pens, styluses, trackballs, keyboards, microphones, scanning devices, and all types of devices that are used input data. User interface(s) 540 may also include output interface(s), which are physical or logical elements that facilitate provisioning of output from operating environment 500. Output may be provided using any type of now known or later-developed physical or logical elements, such displays, printers, speakers, disk drives, and the like.

Communication interface(s) 570 are one or more physical or logical elements that enable external communication by operating environment 500 via one or more protocols or techniques. Examples of communication interface(s) 570 include but are not limited to connectivity devices or computer-executable instructions. External communication may be, but is not necessarily, client-server type communication. Information received at a given network interface may traverse one or more of the several layers of a communication protocol stack or abstract networking model. One exemplary abstract networking model is the OSI Internetworking Model, which has seven layers: layer 1, the physical layer; layer 2, the data link layer; layer 3, the network layer; layer 4, the transport layer; layer 5, the session layer; layer 6, the presentation layer; and layer 7, the application layer.

Specialized hardware/firmware 550 represents any hardware or firmware that implements functions of operating environment 500. Examples of specialized communication hardware include image capture devices, transceivers, encoder/decoders ("CODECs"), decrypters, application-specific integrated circuits, clocks, and the like.

It will be appreciated that particular configurations of operating environment 500 may include fewer, more, or different components or functions than those described. In addition, functional components of operating environment 500 may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer-readable storage medium encoded with computer-executable instructions which, when executed by a processor, perform a method comprising:

identifying a first image of a computer-readable symbol obtained by an image capture device, the computer-readable symbol representing information encoded using a visual symbology arranged on a surface, the visual symbology comprising a plurality of modules of predetermined sizes, each module having a binary reflectance value;

estimating a tilt of the image capture device relative to the surface, by locating at least three points in the first image, the at least three points corresponding to finder patterns within the visual symbology, defining a first point, a second point, and a third point from among the at least three points, determining a first distance between the first point and the second point, determining a second distance between the first point and the third point, calculating a ratio value comprising a ratio of the first distance and the second distance, calculating a scale value comprising a maximum of the first distance and the second distance, and graphically expressing the calculated ratio value and the calculated scale value as a tilt coordinate comprising a point in a two-dimensional coordinate system;

identifying test scale values and test ratio values associated with a plurality of test images obtained using a predetermined image capture device;

graphically expressing the test scale values relative to the test ratio values as points in the two-dimensional coordinate system;

within the two-dimensional coordinate system, identifying a first range of points comprising the test scale values relative to the test ratio values, and a second range of points comprising the test scale values relative to the test ratio values;

ascertaining whether the tilt coordinate is within the first range of points or the second range of points;

calculating a success metric associated with the first image based on either a level of blurriness of the first image or whether the tilt coordinate is within the first range of points or the second range of points;

based on the success metric, prior to attempting to decode the visual symbology within the first image, determining a likelihood of successfully decoding the visual symbology within the first image;

when there is determined to be a likelihood of successfully decoding the visual symbology within the first image, arranging for decoding the visual symbology within the first image; and when there is determined not to be a likelihood of successfully decoding the visual symbology within the first image, not arranging for decoding the visual symbology within the first image, identifying a second image of the computer-readable symbol obtained by the image capture device, based on either the blurriness of the second image or the tilt of the image capture device relative to the surface or both, calculating a success metric associated with the second image, and based on the success metric associated with the second image, determining a likelihood of successfully decoding the visual symbology within the second image.

2. The computer-readable medium according to claim 1, wherein the visual symbology is selected from the group consisting of: a two-dimensional visual symbology and a linear visual symbology.

3. The computer-readable medium according to claim 1, wherein the method step of identifying the first image of the computer-readable symbol comprises receiving the first image from the image capture device.

4. The computer-readable medium according to claim 1, further comprising: ascertaining the level of blurriness of the first image by within the first image, identifying locations estimated to correspond to centers of modules within the visual symbology;

assigning a grayscale value to each identified location to form an array of grayscale values;

identifying at least two proximate grayscale values within the array estimated to correspond to modules having different reflectance values; and calculate a sharpness gradient based on the at least two proximate grayscale values.

5. The computer-readable medium according to claim 4, wherein
the method step of calculating the success metric further comprises:
defining a threshold value of the sharpness gradient;
comparing the calculated sharpness gradient to the threshold value; and
calculating the success metric based on whether the sharpness gradient is above the threshold value or below the threshold value.

6. The computer-readable medium according to claim 1, wherein
the method step of determining a likelihood of successfully decoding the visual symbology within the first image further comprises:
comparing the success metric to a predetermined success threshold; and
based on the step of comparing, determining whether there is a likelihood of successfully decoding or whether there is not a likelihood of successfully decoding.

7. The computer-readable medium according to claim 1, further comprising:
when there is determined not to be a likelihood of successfully decoding, prior to identifying the second image,
arranging to provide feedback to a user of the image capture device, the feedback relating to the tilt of the image capture device relative to the surface, the user able to use the feedback to obtain the second image.

8. The computer-readable medium according to claim 1, wherein the computer-executable instructions are executable by a processor selected from the group consisting of: a client-side processor and a network-side processor.

9. An electronic device, comprising:
an image capture device operable to obtain an image of a computer-readable symbol, the image comprising a plurality of pixels, each pixel having a grayscale value, the computer-readable symbol representing information encoded using a visual symbology arranged on a surface, the visual symbology comprising a plurality of modules, each module having a binary reflectance value;
a computer-readable storage medium; and
a processor responsive to the computer-readable storage medium and to a computer program stored in the computer-readable storage medium, the computer program, when loaded into the processor, operable to:
receive the image from the image capture device;
within the image, identify at least three sections, each section estimated to correspond to a finder pattern within the visual symbology;
based on information obtained via examination of the at least three sections, estimate a tilt of the image capture device relative to the surface by
locating at least three points in the image, the at least three points corresponding to finder patterns within the visual symbology,
defining a first point, a second point, and a third point from among the at least three points,
determining a first distance between the first point and the second point,
determining a second distance between the first point and the third point,
calculating a ratio value comprising a ratio of the first distance and the second distance,
calculating a scale value comprising a maximum of the first distance and the second distance, and
graphically expressing the calculated ratio value and the calculated scale value as a tilt coordinate comprising a point in a two-dimensional coordinate system;
identify test scale values and test ratio values associated with a plurality of test images obtained using a predetermined image capture device;
graphically express the test scale values relative to the test ratio values as points in the two-dimensional coordinate system;
within the two-dimensional coordinate system, identify a first range of points comprising the test scale values relative to the test ratio values, and a second range of points comprising the test scale values relative to the test ratio values;
ascertain whether the tilt coordinate is within the first range of points or the second range of points;
based on whether the tilt coordinage is within the first range of points or the second range of points, or on a level of blurriness of the image or both, determine a likelihood of successfully decoding the visual symbology within the image; and
when there is determined to be a likelihood of successfully decoding the visual symbology,
identify within the image a number of groups of pixels, each group of pixels estimated to correspond to a particular module,
within the image, identify locations estimated to correspond to centers of modules within the visual symbology, each location having associated therewith proximate pixels from one or more groups of pixels, the proximate pixels within a predetermined proximity to the location,
assign a first value to each identified location to form an array of first values, each first value based on a relationship between grayscale values of the proximate pixels associated with the location,
apply a predetermined image processing algorithm to the array of first values to produce an array of a second values for each identified location, and
based on the array of second values, arrange to estimate the binary reflective values of the modules corresponding to the identified locations within the image, the estimated binary reflective values usable to retrieve the information encoded using the visual symbology.

10. The apparatus according to claim 9, wherein the apparatus selected from the group consisting of: a digital camera, a personal digital assistant, a mobilephone, a personal computer, and a portable media player.

* * * * *